(12) United States Patent
Breshears

(10) Patent No.: US 9,467,364 B2
(45) Date of Patent: Oct. 11, 2016

(54) METHOD AND APPARATUS FOR PROVIDING A COMMUNICATIONS PATHWAY WITH HIGH RELIABILITY

(75) Inventor: Brian Richard Breshears, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 819 days.

(21) Appl. No.: 13/444,729

(22) Filed: Apr. 11, 2012

(65) Prior Publication Data

US 2013/0273839 A1    Oct. 17, 2013

(51) Int. Cl.
*H04B 7/15* (2006.01)
*H04L 12/721* (2013.01)
*H04L 12/717* (2013.01)

(52) U.S. Cl.
CPC .............. *H04L 45/12* (2013.01); *H04L 45/42* (2013.01)

(58) Field of Classification Search
USPC ....................................................... 455/11.1
See application file for complete search history.

(56) References Cited

U.S. PATENT DOCUMENTS 6,061,562 A    5/2000 Martin et al.
6,587,687 B1 *  7/2003 Wiedeman ............. 455/428
8,078,162 B2   12/2011 Deaton et al.
2006/0061506 A1 *  3/2006 Murphy ................. 342/357.01

FOREIGN PATENT DOCUMENTS

EP    1826920 B1    11/2011

OTHER PUBLICATIONS

"Boeing Phantom Eye: Hydrogen Powered (H2) High Altitude Long Endurance," Boeing Management Company, Mar. 2012, pp. 1-11.
Djuknic et al., "Establishing Wireless Communications Services via High-Altitude Aeronautical Platforms: A Concept Whose Time Has Come?", IEEE Communications Magazine, Sep. 1997, pp. 128-135.

* cited by examiner

*Primary Examiner* — Ankur Jain
(74) *Attorney, Agent, or Firm* — Yee & Associates, P.C.

(57) ABSTRACT

A method and apparatus for managing a communications network. A potential pathway in a group of potential pathways formed between each pair of adjacent node groups in a plurality of node groups is identified. A communications link is formed along the potential pathway identified between each pair of adjacent node groups in the plurality of node groups such that a series of communications links is formed between a first end node group in the plurality of node groups and a second end node group in the plurality of node groups. Information is exchanged between a first end point and a second end point using the series of communications links between the first end node group and the second end node group.

19 Claims, 14 Drawing Sheets

METHOD AND APPARATUS FOR PROVIDING A COMMUNICATIONS PATHWAY WITH HIGH RELIABILITY

BACKGROUND INFORMATION

1. Field

The present disclosure relates generally to wireless communications and, in particular, to wireless communications using airborne nodes. Still more particularly, the present disclosure relates to a method and apparatus for forming a communications channel with desired levels of availability and reliability using airborne nodes.

2. Background

A communications channel is a pathway between two nodes that allows information to be exchanged between these two nodes. As used herein, a "node" is a communications system configured to send and/or receive information over a communications channel. A wireless communications channel is a communications channel between two nodes that are not physically connected. For example, a wireless communications channel may be established between two ground nodes to allow these ground nodes to exchange information. The exchange of information between the two ground nodes may include one ground node sending information to and/or receiving information from the other ground node.

However, in some situations, the distance between the two ground nodes may be greater than a maximum communications range for at least one of the ground nodes. The maximum communications range for a ground node is the maximum distance from the ground node along which a communications channel having a desired bandwidth may be established with another node. As used herein, "bandwidth" is the amount of information that may be sent over a communications channel over a selected period of time. In some cases, bandwidth is identified in bits per second.

When the distance between the two ground nodes is greater than the maximum communications range for at least one of the ground nodes, one or more airborne nodes may be used to transfer information between these ground nodes. As used herein, an "airborne node" is a node located in the air between the ground and outer space. An airborne node may be implemented in, for example, an aircraft or an unmanned aerial vehicle (UAV).

For example, a first ground node may be wirelessly connected to a series of airborne nodes, which may be wirelessly connected to the second ground node. The series of airborne nodes includes one or more airborne nodes wirelessly connected to each other, with one following right after the other. The wireless connection between two nodes is typically referred to as a wireless communications link. The wireless communications links between the first ground node, the series of airborne nodes, and the second ground node form a communications channel through which information may be exchanged between the first ground node and the second ground node.

A number of factors may affect the availability and/or reliability of this communications channel. As used herein, "availability" is the ratio of the total amount of time that a communications channel is capable of being used during a given period of time to the length of that period of time. Further, "reliability", as used herein, is the ability of the communications channel to provide the desired bandwidth within selected tolerances with respect to a specific period of time.

For example, weather conditions may affect the availability and/or reliability of the communications channel. Additionally, the communications channel may be unavailable when an aircraft on which an airborne node is implemented returns to the ground for refueling. Further, other factors, such as, for example, without limitation, altitude of the airborne nodes, the distance between each pair of adjacent airborne nodes in the series of airborne nodes, the speed of the aircraft on which an airborne node is located, and/or other suitable factors may affect the availability and/or reliability of the communications channel.

In some cases, a communications channel with a certain level of availability and a certain level of reliability may be needed for performing a number of tasks in a mission. Some currently available systems for forming communications channels using airborne nodes may be unable to form a communications channel that has the desired level of availability and the desired level of reliability. Therefore, it would be desirable to have a method and apparatus that takes into account at least some of the issues discussed above as well as possibly other issues.

SUMMARY

In one illustrative embodiment, a communications network comprises a plurality of node groups and a control system. Each node group in the plurality of node groups comprises a plurality of nodes. Each node group in the plurality of node groups is configured to form a group of potential pathways for a communications link between each node group and another node group in the plurality of node groups. The control system is configured to form a communications channel between a first end point and a second end point using a series of communications links between a first end node group in the plurality of node groups and a second end node group in the plurality of node groups. A communications link in the series of communications links between a first node group in the plurality of node groups and a second node group in the plurality of node groups is formed along a potential pathway selected from the group of potential pathways between the first node group and the second node group.

In another illustrative embodiment, a communications network comprises a plurality of node groups and a control system. The plurality of node groups comprises a first end node group, a second end node group, and a set of node groups. Each node group in the set of node groups comprises a plurality of airborne nodes. Each of the plurality of node groups is configured to form a group of potential pathways for a communications link with another node group in the plurality of node groups. The control system comprises a plurality of controllers. Each controller in the plurality of controllers is configured to control a corresponding node group in the plurality of node groups and form one communications link in a series of communications links between the first end node group and the second end node. The one communications link is formed between the corresponding node group and an adjacent node group in the plurality of node groups along a potential pathway selected from the group of potential pathways formed between the corresponding node group and the adjacent node group.

In another illustrative embodiment, a method for managing a communications network is provided. A potential pathway in a group of potential pathways formed between each pair of adjacent node groups in a plurality of node groups is identified. A communications link is formed along the potential pathway identified between each pair of adjacent node groups in the plurality of node groups such that a series of communications links is formed between a first end node group in the plurality of node groups and a second end node group in the plurality of node groups. Information is exchanged between a first end point and a second end point using the series of communications links between the first end node group and the second end node group.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

The different illustrative embodiments recognize and take into account different considerations. For example, the different illustrative embodiments recognize and take into account that it may be desirable to have a communications system configured to form a communications channel having a desired level of availability and a desired level of reliability using one or more airborne nodes.

For example, a ship at sea may need to receive substantially real-time information from a ground station during a selected period of time to perform a particular mission. The ship and the ground station may be too far apart to form a communications channel between the ship and the ground station using only one communications link. Consequently, the communications channel may be formed using a series of airborne nodes implemented on unmanned aerial vehicles (UAVs) to form the communications channel between the ground station and the ship.

The different illustrative embodiments recognize and take into account that in some cases, this communications channel may need to have a level of availability and a level of reliability above about 98 percent during the selected period of time such that the ship can perform the particular mission. Further, the different illustrative embodiments recognize that some currently available systems for establishing a communications channel using airborne nodes may be unable to provide this level of reliability and level of availability.

For example, one of the unmanned aerial vehicles on which an airborne node is implemented may be unable to carry enough fuel for the unmanned aerial vehicle to remain in flight during the entire selected period of time. As a result, communications between the ship and the ground station may be temporarily disrupted while the unmanned aerial vehicle is refueling. This disruption may reduce the overall availability and reliability of the communications channel more than desired.

In some cases, weather conditions may prevent an airborne node on a particular unmanned aerial vehicle from being able to maintain a communications link with another airborne node, the ground station, or the ship for the selected period of time. For example, weather conditions, such as rain, snow, wind, hail, cloudiness, and/or other types of weather conditions may affect the availability and reliability of a particular communications link between two airborne nodes.

Figure 1:
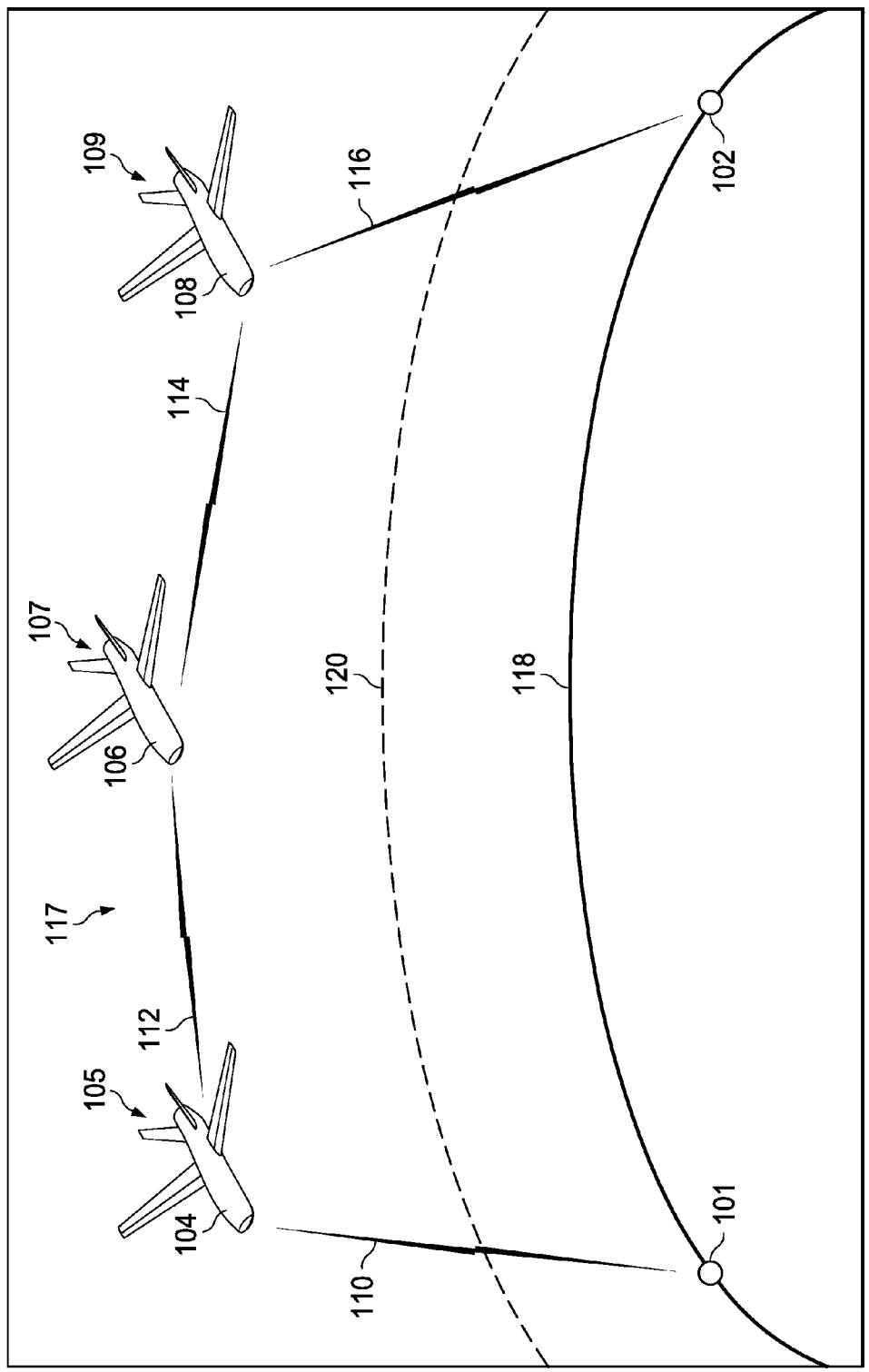
FIG. 1 is an illustration of a known configuration for a communications network in accordance with an illustrative embodiment.

With reference now to FIG. 1, an illustration of a known configuration for a communications network is depicted. In FIG. 1, communications network 100 includes ground node 101, ground node 102, airborne node 104, airborne node 106, and airborne node 108. As depicted, airborne node 104, airborne node 106, and airborne node 108 are implemented in unmanned aerial vehicle 105, unmanned aerial vehicle 107, and unmanned aerial vehicle 109, respectively.

Ground node 101 and ground node 102 use airborne node 104, airborne node 106, and airborne node 108 to exchange information between ground node 101 and ground node 102. In particular, ground node 101 is configured to send information to and/or receive information from airborne node 104 using communications link 110. Airborne node 104 is configured to send information to and/or receive information from airborne node 106 using communications link 112.

Further, airborne node 106 is configured to send information to and/or receive information from airborne node 108 using communications link 114. Airborne node 108 is configured to send information to and/or receive information from ground node 102 using communications link 116. Communications link 110, communications link 112, communications link 114, and communications link 116 form communications channel 117 between ground node 101 and ground node 102.

Airborne node 104, airborne node 106, and airborne node 108 are positioned above ground 118 such that the line of sight between airborne node 104 and airborne node 106 and the line of sight between airborne node 106 and airborne node 108 is above altitude 120. Altitude 120 is selected as an altitude below which most weather events may occur.

These weather events include, for example, precipitation, clouds, snow, lightning, storms, and/or other types of weather events.

The different illustrative embodiments recognize and take into account that communications channel 117 formed between ground node 101 and ground node 102 using this known configuration for communications network 100 may not have a desired level of availability and/or a desired level of reliability. For example, the different illustrative embodiments recognize and take into account that communications channel 117 may be disrupted and/or unable to provide a desired bandwidth for communications when one or more of airborne node 104, airborne node 106, and airborne node 108 becomes unavailable.

Figure 2:
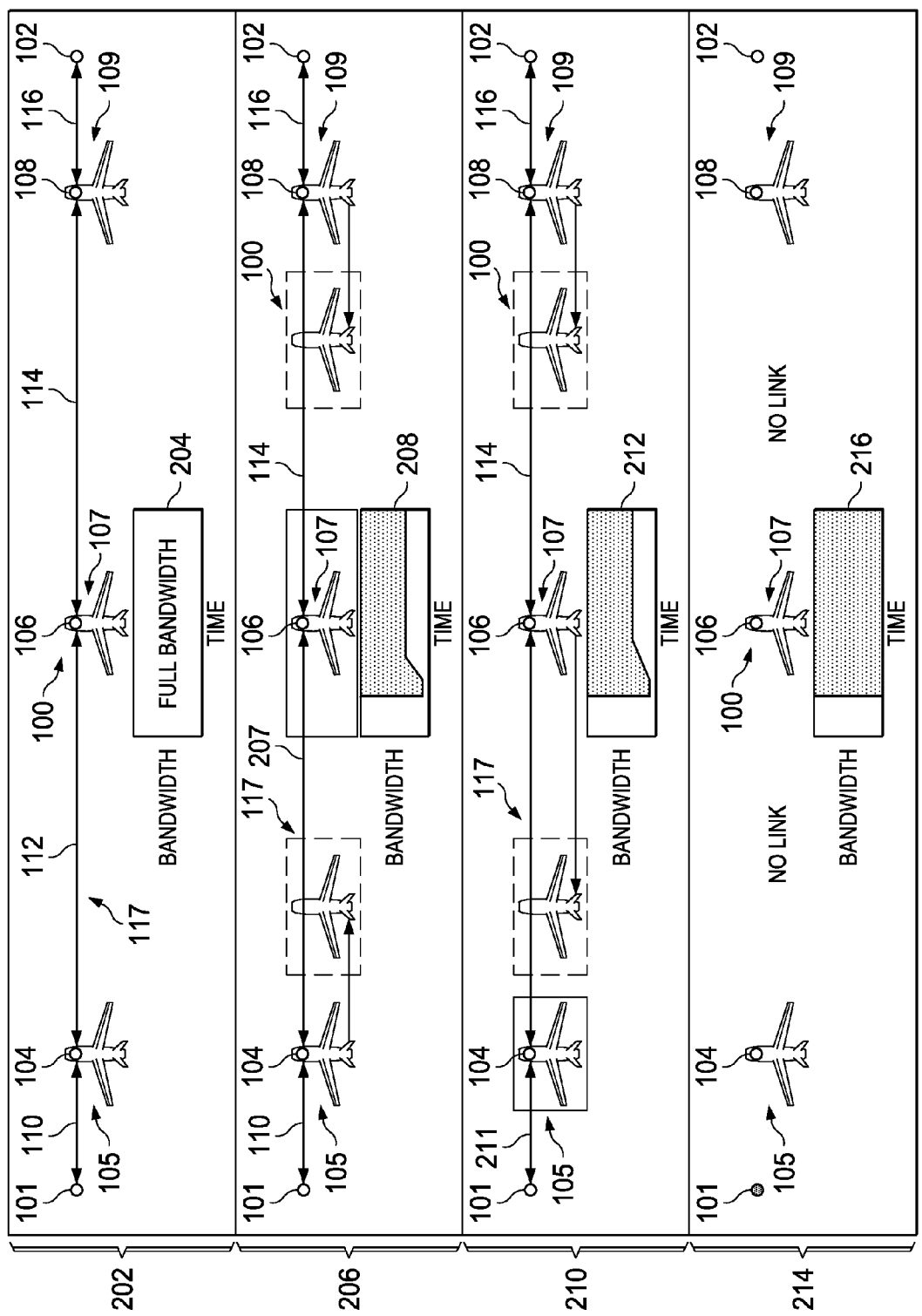
FIG. 2 is an illustration of different states for a known configuration for a communications network in accordance with an illustrative embodiment.

With reference now to FIG. 2, an illustration of different states for a known configuration for a communications network is depicted. In FIG. 2, different states for communications network 100 in FIG. 1 are depicted. In normal state 202, ground node 101, ground node 102, airborne node 104, airborne node 106, and airborne node 108 operate within selected parameters. In normal state 202, communications channel 117 is available for allowing communications between ground node 101 and ground node 102.

Further, in normal state 202, communications channel 117 provides a desired level of bandwidth for communications between ground node 101 and ground node 102. The bandwidth provided in normal state 202 is indicated in graph 204. However, with this configuration for communications network 100, communications channel 117 may become unavailable or unable to provide the desired level of bandwidth when one or more of ground node 101, ground node 102, airborne node 104, airborne node 106, and airborne node 108 become unavailable. A node may become unavailable when the node is not located in a particular region and/or does not operate within selected parameters.

For example, in undesired state 206, airborne node 106 is unavailable. Consequently, communications link 112 and communications link 114 are unavailable in undesired state 206. Airborne node 106 may become unavailable when unmanned aerial vehicle 107 travels to a different location, returns to the ground for refueling, or encounters undesired weather conditions.

When airborne node 106 becomes unavailable, unmanned aerial vehicle 105 and unmanned aerial vehicle 109 may move closer to each other to form communications link 207 between airborne node 104 on unmanned aerial vehicle 105 and airborne node 108 on unmanned aerial vehicle 109. However, with communications link 110, communications link 207, and communications link 116, communications channel 117 provides a level of bandwidth that is less than desired for a period of time. The bandwidth provided in undesired state 206 is indicated in graph 208.

In undesired state 210, airborne node 104 is unavailable. Consequently, communications link 110 and communications link 112 are also unavailable. Unmanned aerial vehicle 107 may move to a new location that is closer to ground node 101 to establish communications link 211 with ground node 101. Further, unmanned aerial vehicle 109 may also move closer to the new location for unmanned aerial vehicle 107 such that airborne node 108 may maintain communications link 116 with airborne node 106. However, with communications link 211, communications link 114, and communications link 116, communications channel 117 provides a level of bandwidth that is less than desired for a period of time. The bandwidth provided in undesired state 210 is indicated in graph 212.

Further, in undesired state 214, ground node 101 is unavailable. When ground node 101 is unavailable, no communications links may be established between ground node 101 and ground node 102. In other words, when ground node 101 is unavailable, communications channel 117 may be unavailable. The bandwidth provided in undesired state 214 is indicated in graph 216.

The different illustrative embodiments recognize and take into account that this type of configuration for a communications network may not provide a desired level of availability and/or a desired level of reliability with respect to bandwidth for a communications channel between two ground nodes. Thus, the different illustrative embodiments provide a method and apparatus for establishing a communications channel that has a level of availability and a level of reliability that is greater than about 98 percent using one or more airborne node groups.

Figure 3:
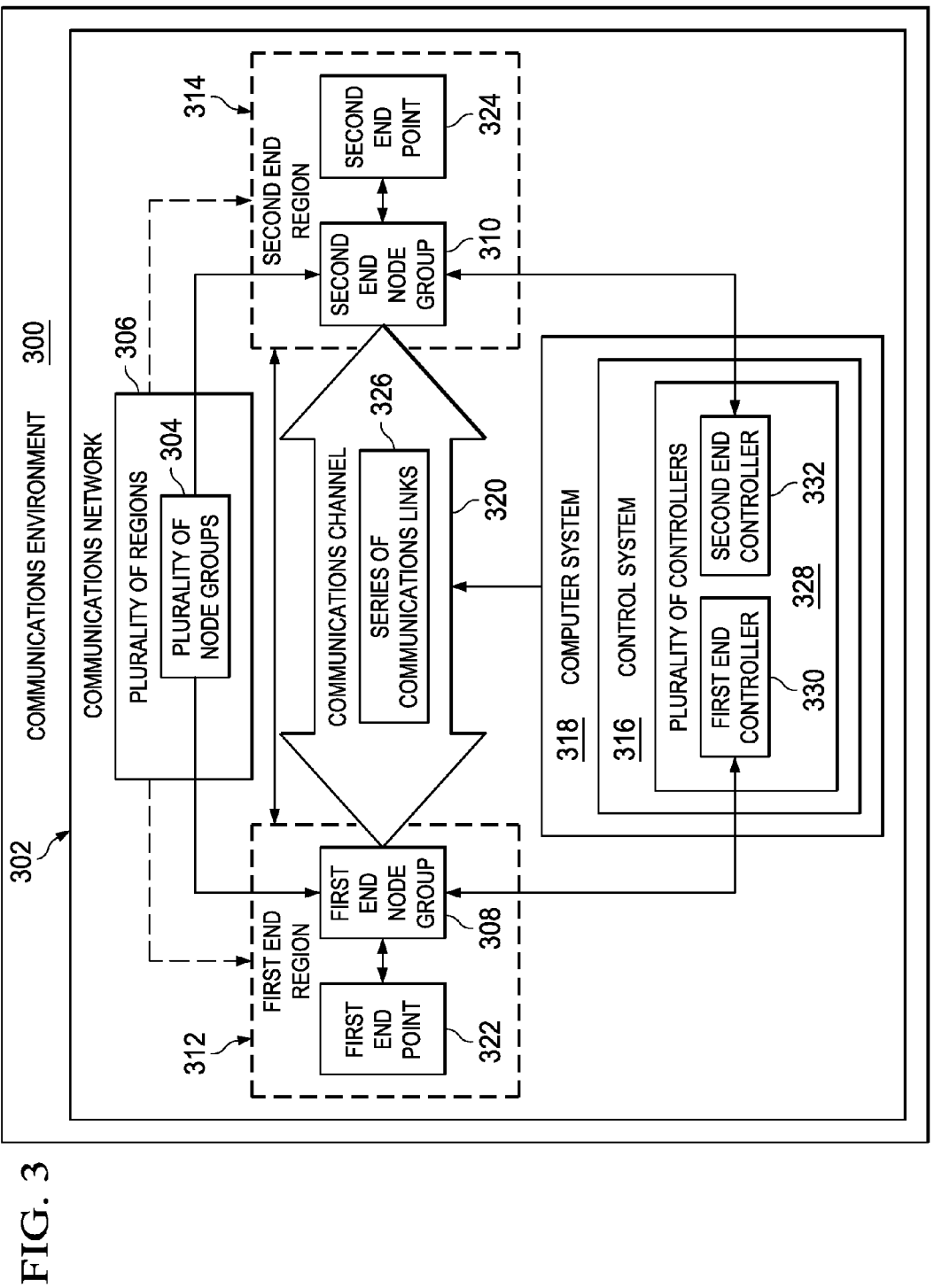
FIG. 3 is an illustration of a communications environment in accordance with an illustrative embodiment.

With reference now to FIG. 3, an illustration of a communications environment is depicted in accordance with an illustrative embodiment in the form of a block diagram. Communications environment 300 is an environment in which communications network 302 may be implemented in accordance with an illustrative embodiment.

Communications network 302 may comprise plurality of node groups 304. As used herein, a "plurality of" items means two or more items. For example, plurality of node groups 304 means two or more node groups. In these illustrative examples, each node group in plurality of node groups 304 includes a plurality of nodes.

As used herein, a "node" in communications network 302 is a communications system configured to send information, receive information, or perform a combination of the two. In particular, in these illustrative examples, a node in communications network 302 is a wireless communications system configured to send information to and/or receive information from another node in communications network 302 without the two nodes being physically connected.

A node in communications network 302 may be configured to send and/or receive information using one or more wireless signals. A wireless signal may take the form of, for example, an electromagnetic signal. An electromagnetic signal may be selected from one of, for example, without limitation, a radio frequency (RF) signal, a microwave signal, an infrared signal, an optical signal, or some other suitable type of electromagnetic signal.

Further, a node in one of plurality of node groups 304 may be configured to form a potential pathway for wireless communications between the node and each of a plurality of nodes in another node group in plurality of node groups 304. As used herein, a "potential pathway" between two nodes is a pathway that may be potentially used for exchanging information between these two nodes.

In these illustrative examples, each node group in plurality of node groups 304 is located in a region in plurality of regions 306. As used herein, a "region" in plurality of regions 306 may be a physical area or volume of space on Earth, in the atmosphere above Earth, or in outer space.

For example, a region in plurality of regions 306 may comprise at least one of a ground region, an aerial region, an underground region, an underwater region, a region over a body of water, a space region, and some other suitable type of region. In one illustrative example, plurality of regions 306 includes at least one aerial region.

As used herein, the phrase "at least one of", when used with a list of items, means that different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and 10 of item C; four of item B and seven of item C; or some other suitable combination.

In these illustrative examples, two node groups in plurality of node groups 304 may not be located in the same region in plurality of regions 306. In this manner, each node group in plurality of node groups 304 may be located in a corresponding region in plurality of regions 306 in which only that node group is present in the corresponding region.

First end node group 308 and second end node group 310 are examples of node groups in plurality of node groups 304. First end node group 308 is located in first end region 312 in plurality of regions 306. Second end node group 310 is located in second end region 314 in plurality of regions 306. In one illustrative example, first end region 312 and second end region 314 may be ground regions. In another illustrative example, at least one of first end region 312 and second end region 314 may be an aerial region.

The different nodes in plurality of node groups 304 in communications network 302 may be controlled using control system 316. In these illustrative examples, control system 316 is considered part of communications network 302. Of course, in other illustrative examples, at least a portion of control system 316 may be considered separate from communications network 302. As used herein, "at least a portion" of an item means some or all of the item.

Control system 316 may be implemented using hardware, software, or a combination of the two. In one illustrative example, control system 316 is implemented in computer system 318. As used herein, a "computer system", such as computer system 318, may comprise one or more computers. When more than one computer is present in computer system 318, these computers may be in communication with each other. Further, these computers may be in the same and/or different locations, depending on the implementation.

Control system 316 is configured to form communications channel 320 between first end point 322 and second end point 324 using plurality of node groups 304. In these illustrative examples, first end point 322 is located within first end region 312, and second end point 324 is located within second end region 314. Of course, in other illustrative examples, first end point 322 and/or second end point 324 may be located outside of first end region 312 and/or second end region 314, respectively. Further, first end point 322 and second end point 324 may take the form of computer systems in these examples.

Communications channel 320 is a wireless communications channel along which information may be exchanged between first end point 322 and second end point 324. In one illustrative example, first end point 322 may send information to first end node group 308 in first end region 312. First end node group 308 then sends this information to second end node group 310 in second end region 314 using communications channel 320. Then, second end node group 310 sends the information to second end point 324.

In another illustrative example, second end point 324 may send information to second end node group 310. Second end node group 310 then sends this information to first end node group 308 using communications channel 320. Then, first end node group 308 sends this information to first end point 322. Of course, in some illustrative examples, communications along communications channel 320 may occur in both a first direction towards second end node group 310 and a second direction towards first end node group 308 simultaneously.

In these illustrative examples, control system 316 forms communications channel 320 using series of communications links 326 between plurality of node groups 304. Each communications link in series of communications links 326 is between a node group in plurality of node groups 304 and another node group in plurality of node groups 304.

As used herein, a "communications link" between two node groups is a wireless connection between a node in one node group and another node in the other node group. When the wireless connection is formed between these two nodes, information may be exchanged between the two nodes. In these illustrative examples, the communications link between two node groups may take the form of a radio frequency communications link, a laser communications link, an optical communications link, or some other suitable type of wireless communications link.

Further, as used herein, a "series of communications links", such as series of communications links 326, is one or more communications links that are formed one right after another. The one or more communications links may form, for example, without limitation, a succession or train of communications links with one following after the other. In these illustrative examples, series of communications links 326 comprises one or more communications links between first end node group 308 and second end node group 310.

As depicted, control system 316 comprises plurality of controllers 328. In these illustrative examples, each controller in plurality of controllers 328 may be implemented using hardware, software, or a combination of the two.

Each controller in plurality of controllers 328 is configured to control a node group in plurality of node groups 304 in these illustrative examples. For example, plurality of controllers 328 includes first end controller 330 and second end controller 332. First end controller 330 is configured to control first end node group 308. Second end controller 332 is configured to control second end node group 310.

Figure 4A:
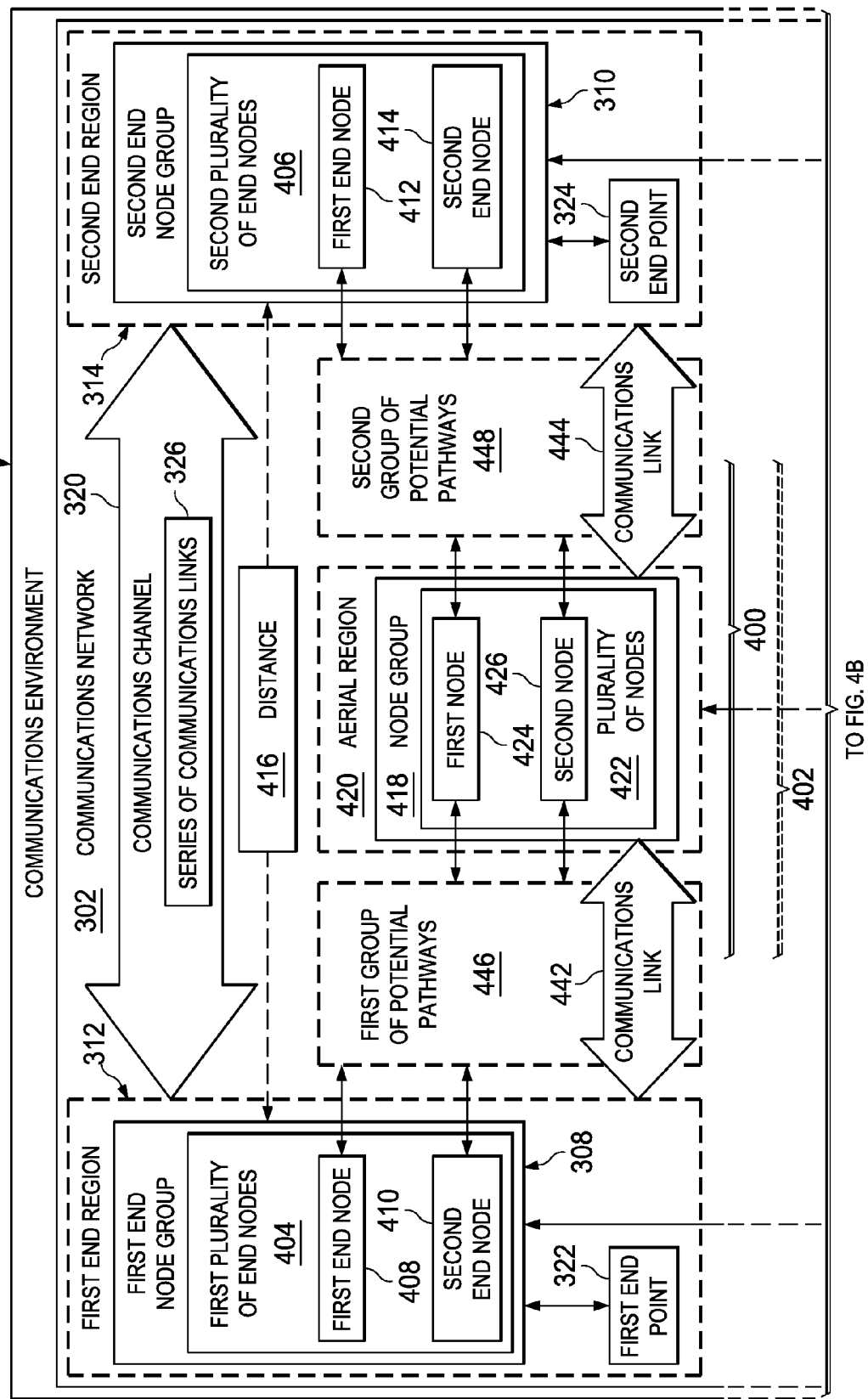
FIGS. 4A and 4B are more-detailed illustrations of a communications environment in accordance with an illustrative embodiment.
Figure 4B:
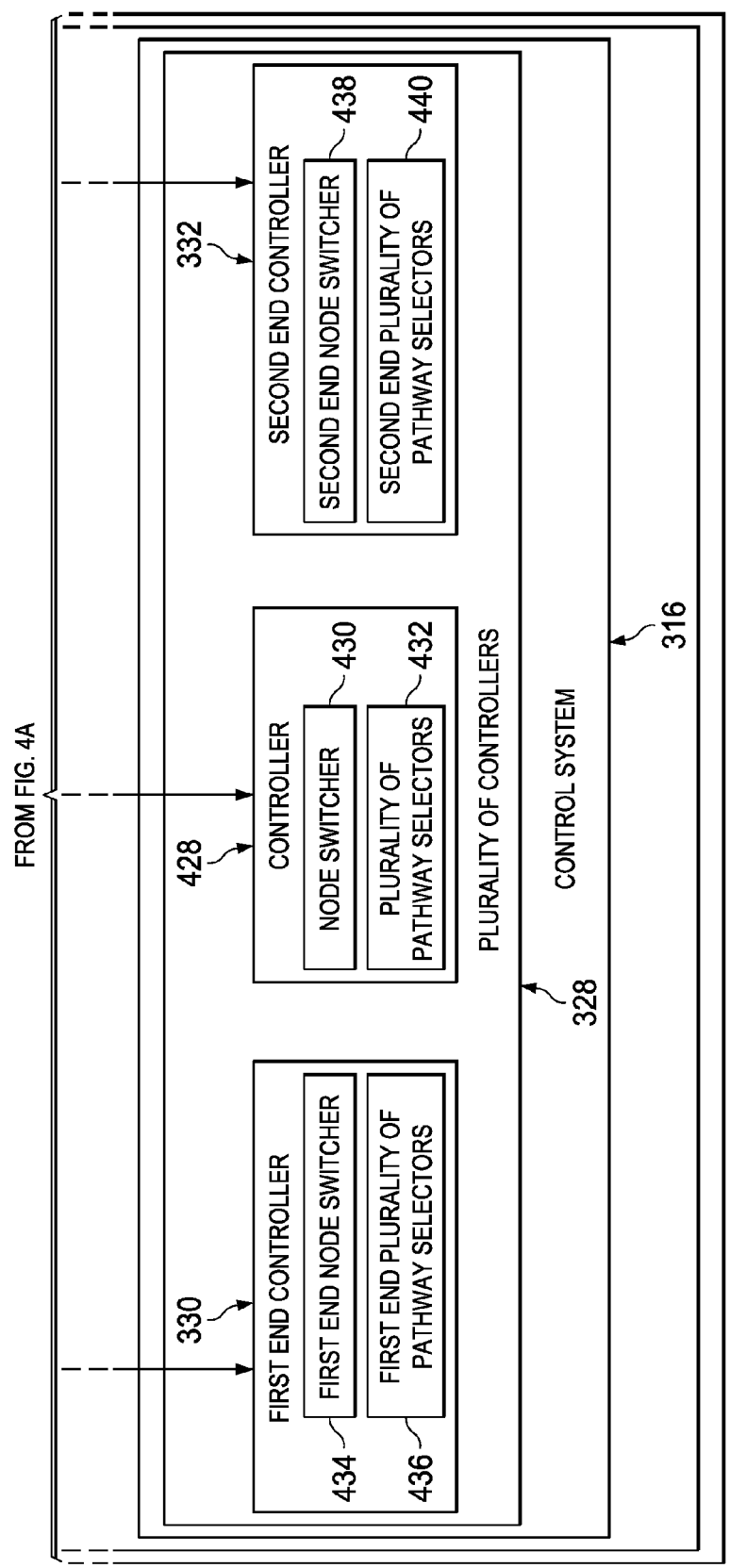

With reference now to FIGS. 4A and 4B, more-detailed illustrations of a communications environment are depicted in accordance with an illustrative embodiment in the form of a block diagram. In FIGS. 4A and 4B, a more-detailed configuration for communications network 302 from FIG. 3 is depicted.

In this illustrative example, communications network 302 includes first end node group 308, second end node group 310, and set of node groups 400. First end node group 308, second end node group 310, and set of node groups 400 are examples of node groups in plurality of node groups 304 in FIG. 3. As used herein, a "set of" items means zero or more items. In this manner, a set of items may be a null or empty set in some cases. For example, set of node groups 400 may be zero, one, two, three, or some other number of node groups.

As depicted, first end node group 308 is located in first end region 312. Second end node group 310 is located in second end region 314. Further, each node group in set of node groups 400 may be located in a corresponding region in set of regions 402. Set of regions 402 may be located between first end region 312 and second end region 314.

In this illustrative example, when set of regions 402 is not an empty set, set of regions 402 is a set of aerial regions. In other words, each region in set of regions 402 is a region of airspace. However, when set of regions 402 is an empty set, at least one of first end region 312 and second end region 314 may be an aerial region.

As depicted, first end node group 308 includes first plurality of end nodes 404, and second end node group 310 includes second plurality of end nodes 406. In this illustrative example, first plurality of end nodes 404 includes first end node 408 and second end node 410. Second plurality of end nodes 406 includes first end node 412 and second end node 414.

In this illustrative example, communications network 302 also includes first end point 322 in first end region 312 and second end point 324 in second end region 314. First end point 322 and second end point 324 may each take the form of, for example, without limitation, a computer system associated with a platform.

As used herein, a "platform" may be selected from one of a mobile platform and a stationary platform. A mobile platform may take the form of, for example, without limitation, an aircraft, an unmanned aerial vehicle (UAV), a space shuttle, a ship, a submarine, some other suitable type of aerial vehicle, water vehicle, land-based vehicle, or space-based vehicle, or some other suitable type of mobile platform. A stationary platform may take the form of, for example, without limitation, a ground station, an airport, a satellite, a building, a manufacturing facility, a computer system, a space station, or some other suitable type of stationary platform.

Further, each node in a node group, such as, for example, first end node 408 and second end node 410 in first end node group 308, may be located on a platform. Depending on the implementation, the different nodes in a node group may be associated with the same platform or different platforms. For example, first end node 408 may be located on a same or different platform as second end node 410. Further, first end point 322 may be located on a same or different platform as first end node 408 and/or second end node 410. Second end point 324 may be located on a same or different platform as first end node 412 and/or second end node 414.

In this illustrative example, first end point 322 is configured to communicate with second end point 324 using at least one of first end node 408 and second end node 410 in first end node group 308. Further, second end point 324 is configured to communicate with first end point 322 using at least one of first end node 412 and second end node 414 in second end node group 310.

In some cases, distance 416 between first end node group 308 in first end region 312 and second end node group 310 in second end region 314 may be greater than a selected threshold for communications between these two end node groups. This selected threshold may be, for example, a maximum communications range that is the maximum distance between the two node groups at which a communications link having a desired bandwidth may be established.

In other words, when distance 416 is greater than this selected threshold, first end point 322 and second end point 324 may be unable to communicate with each other directly using a single communications link between first end node group 308 and second end node group 310. Consequently, one or more nodes may be needed to establish communications between first end point 322 and second end point 324.

The selected threshold for distance 416 may be based on a number of different factors. These factors may include, for example, without limitation, the communications range of first end node 408 and second end node 410 in first end node group 308 and the communications range of first end node 412 and second end node 414 in second end node group 310. Further, these factors may also include weather conditions.

When distance 416 is greater than the selected threshold, set of node groups 400 may include at least one node group.

The number of node groups included in set of node groups 400 may depend on a number of different factors. These factors may include, for example, without limitation, altitude at which a particular node group will be located, the communications range for each node in a node group, and/or other suitable factors.

In one illustrative example, set of node groups 400 includes node group 418. Node group 418 may be the only node group in set of node groups 400 in this example. Node group 418 is located in aerial region 420. As depicted, node group 418 comprises plurality of nodes 422. Each node in plurality of nodes 422 may be referred to as an airborne node in this example. Plurality of nodes 422 includes first node 424 and second node 426.

Further, in this illustrative example, controller 428 in plurality of controllers 328 is configured to control node group 418. As depicted, controller 428 includes node switcher 430 and plurality of pathway selectors 432. Similarly, first end controller 330 includes first end node switcher 434 and first end plurality of pathway selectors 436. Further, second end controller 332 includes second end node switcher 438 and second end plurality of pathway selectors 440.

As used herein, a "node switcher", such as node switcher 430, first end node switcher 434, and second end node switcher 438, is configured to identify a node in the node group corresponding to the node switcher for forming a communications link with another node in another node group. For example, node switcher 430 is configured to select one of first node 424 and second node 426 for forming communications link 442 with first end node group 308. Further, first end node switcher 434 is also configured to select one of first node 424 and second node 426 for forming communications link 444 with second end node group 310.

When a node switcher in a controller for a node group selects a node for forming a communications link, a pathway selector in a plurality of pathway selectors for that node group is configured to select a pathway for forming that communications link. In this manner, a "pathway selector", such as, for example, a pathway selector in one of plurality of pathway selectors 432, first end plurality of pathway selectors 436, and second end plurality of pathway selectors 440, is configured to identify one of a plurality of potential pathways formed by the selected node for use in forming the communications link.

In some illustrative examples, each controller in plurality of controllers 328 may be implemented within a data processing system on the platform with which each node in a node group is associated. For example, first node 424 and second node 426 may each be associated with an unmanned aerial vehicle. Controller 428 may be implemented using a data processing system on each of these unmanned aerial vehicles.

In this illustrative example, each node in a node group is configured to form a potential pathway between itself and each node in a node group adjacent to the node group. For example, each node in node group 418 is configured to form a potential pathway between that node and each node in first end node group 308. Further, each node in node group 418 is configured to form a potential pathway between that node and each node in second end node group 310.

As depicted, first group of potential pathways 446 may be formed between node group 418 and first end node group 308. Any one of the potential pathways in first group of potential pathways 446 may be used to establish communications link 442 between node group 418 and first end node group 308. Further, second group of potential pathways 448 may be formed between node group 418 and second end node group 310. Any one of the potential pathways in second group of potential pathways 448 may be used to establish communications link 444 between node group 418 and second end node group 310.

In this manner, a potential pathway from each group of potential pathways between each pair of adjacent node groups in plurality of node groups 304 in FIG. 3 is selected to form a communications link. A selected potential pathway between a pair of adjacent node groups is between a first selected node in a first node group in plurality of node groups 304 and a second selected node in a second node group in plurality of node groups 304. These different selected potential pathways are used to form series of communications links 326 for communications channel 320.

When one of the potential pathways in a group of potential pathways is no longer available for use in forming a particular communications link, another potential pathway in the group of potential pathways may be used to form that communications link. Control system 316 is configured to ensure that series of communications links 326 has a desired level of availability and a desired level of reliability.

Figure 5A:
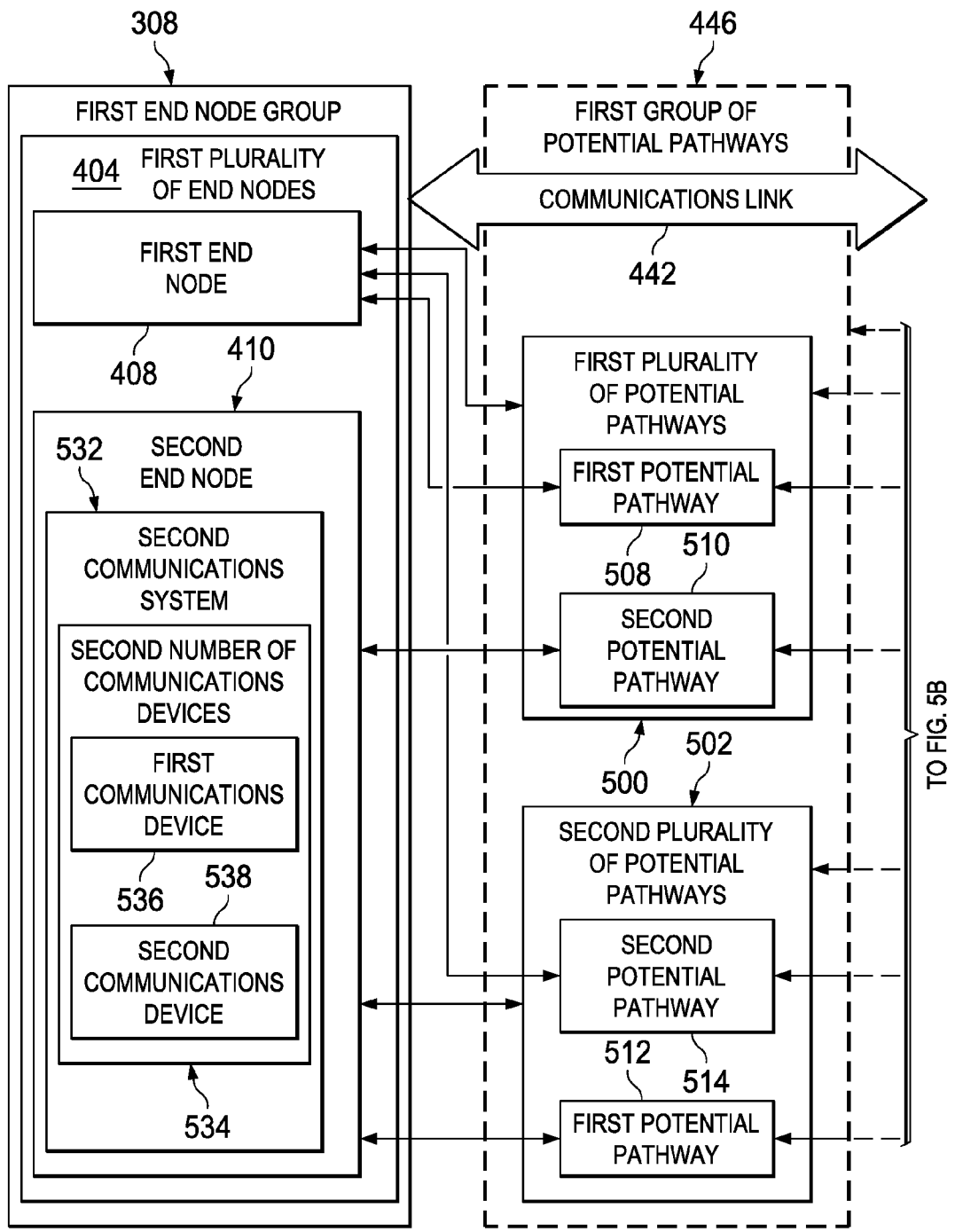
FIGS. 5A-5C are more-detailed illustrations of the potential pathways that can be formed in a communications network in accordance with an illustrative embodiment.
Figure 5B:
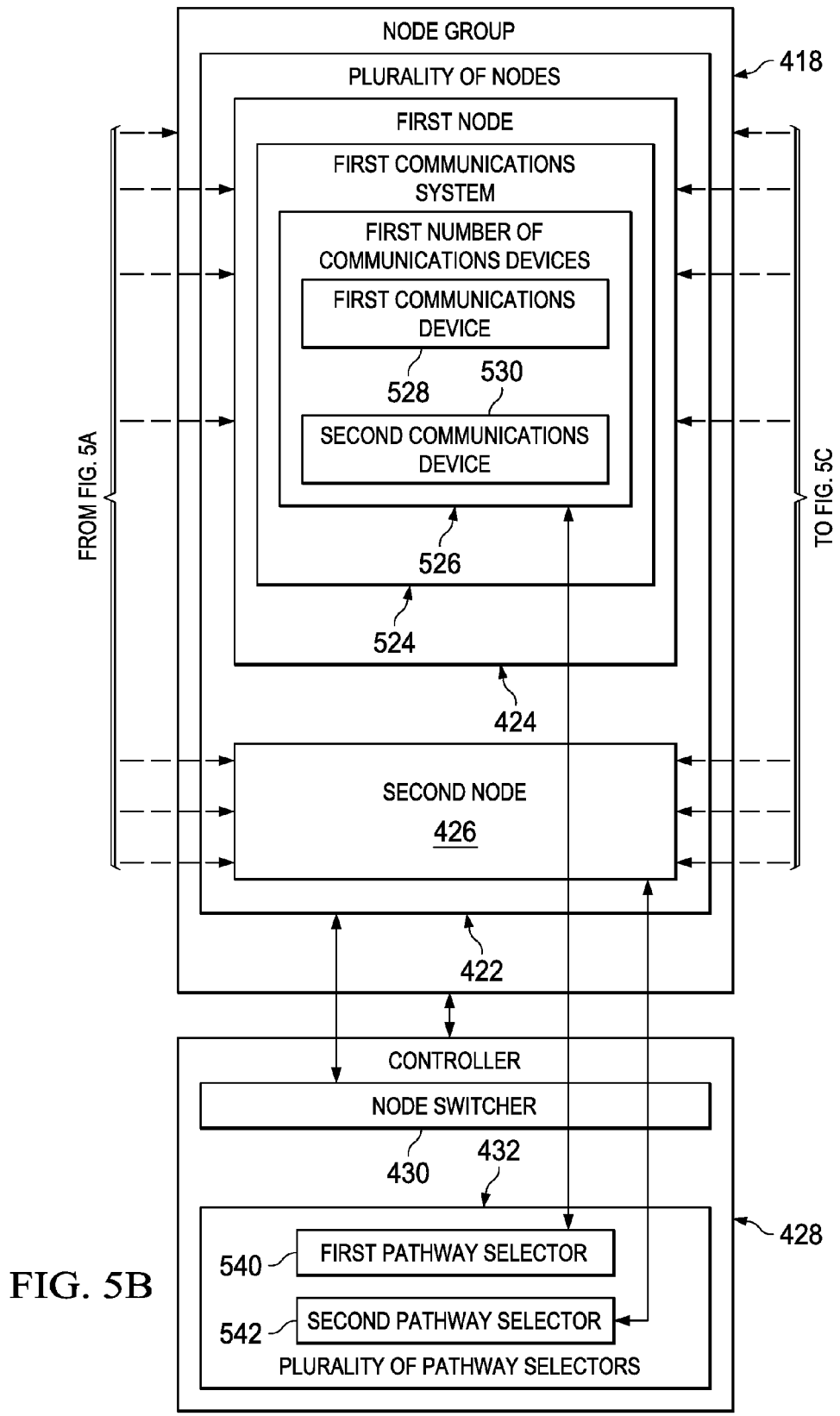
Figure 5C:
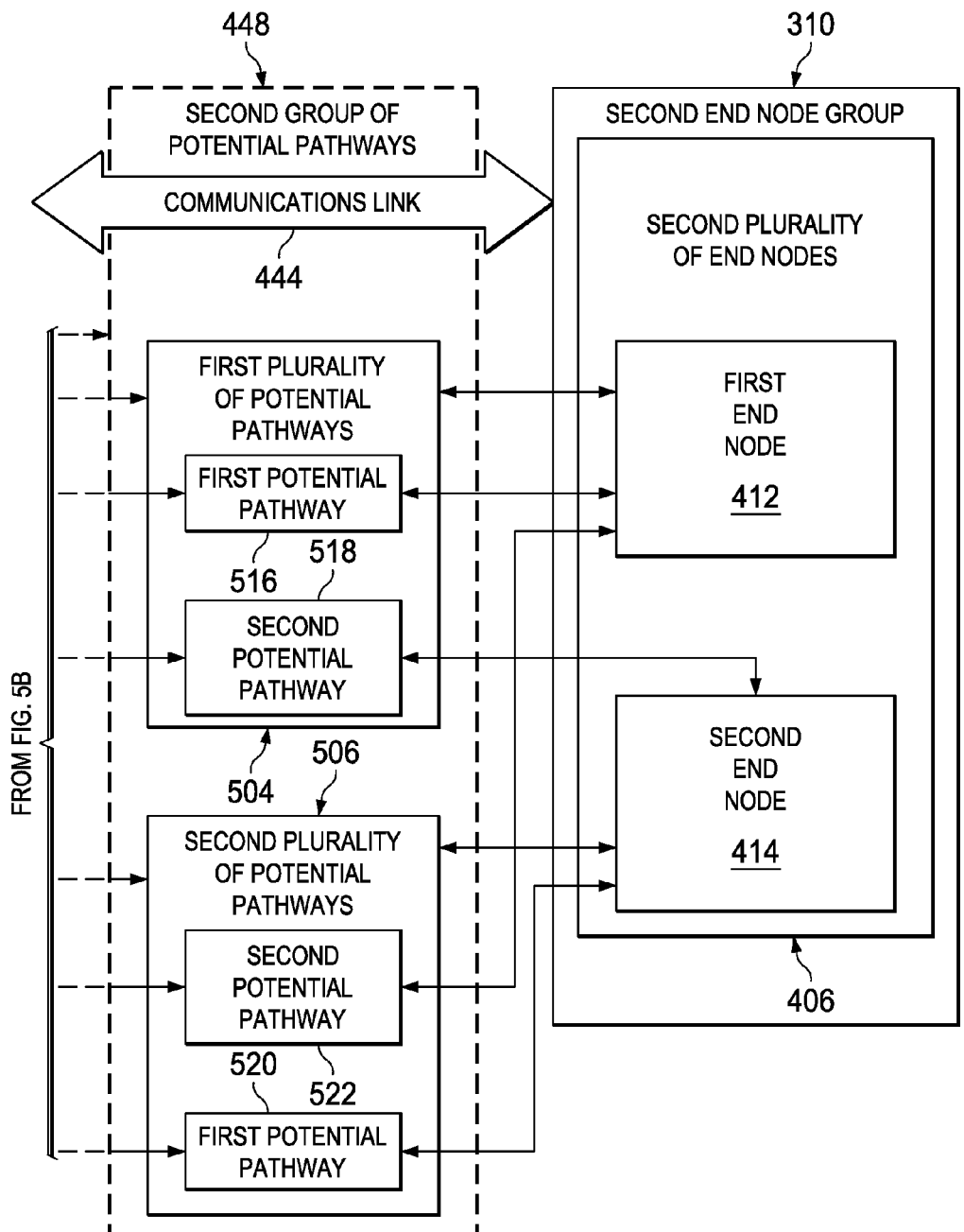

Turning now to FIGS. 5A-5C, more-detailed illustrations of the potential pathways that can be formed in a communications network is depicted in accordance with an illustrative embodiment in the form of a block diagram. In FIGS. 5A-5C, a more-detailed configuration for first end node group 308, second end node group 310, and node group 418 from FIG. 4 is depicted.

As illustrated, first group of potential pathways 446 between node group 418 and first end node group 308 may include first plurality of potential pathways 500 and second plurality of potential pathways 502. Further, second group of potential pathways 448 between node group 418 and second end node group 310 may include first plurality of potential pathways 504 and second plurality of potential pathways 506.

In this illustrative example, first plurality of potential pathways 500 in first group of potential pathways 446 may include potential pathways between first node 424 in node group 418 and the different nodes in first plurality of end nodes 404 in first end node group 308. For example, first plurality of potential pathways 500 includes first potential pathway 508 between first node 424 in node group 418 and first end node 408 in first end node group 308. Further, first plurality of potential pathways 500 includes second potential pathway 510 between first node 424 in node group 418 and second end node 410 in first end node group 308.

Second plurality of potential pathways 502 may include potential pathways between second node 426 in node group 418 and the different nodes in first plurality of end nodes 404 in first end node group 308. For example, second plurality of potential pathways 502 includes first potential pathway 512 between second node 426 in node group 418 and second end node 410 in first end node group 308. Further, second plurality of potential pathways 502 includes second potential pathway 514 between second node 426 in node group 418 and first end node 408 in first end node group 308.

Similarly, first plurality of potential pathways 504 in second group of potential pathways 448 may include potential pathways between first node 424 in node group 418 and the different nodes in second plurality of end nodes 406 in second end node group 310. For example, first plurality of potential pathways 504 includes first potential pathway 516 between first node 424 in node group 418 and first end node 412 in second end node group 310. Further, first plurality of potential pathways 504 includes second potential pathway 518 between first node 424 in node group 418 and second end node 414 in second end node group 310.

Second plurality of potential pathways 506 may include potential pathways between second node 426 in node group 418 and the different nodes in second plurality of end nodes 406 in second end node group 310. For example, second plurality of potential pathways 506 includes first potential pathway 520 between second node 426 in node group 418 and second end node 414 in second end node group 310. Further, second plurality of potential pathways 506 includes second potential pathway 522 between second node 426 in node group 418 and first end node 412 in second end node group 310.

In these illustrative examples, a potential pathway may be formed between two nodes in a number of different ways. As one illustrative example, a node in a node group may take the form of a communications system. As used herein, a "communications system" may comprise one or more communications devices configured to send and/or receive wireless signals.

In particular, a "communications device", as used herein, is a device configured to send and/or receive wireless signals over a communications link. A communications device may be configured to point in at least one direction to send wireless signals in this direction and/or receive wireless signals from this direction.

In these illustrative examples, a communications device may be selected from one of, for example, without limitation, a parabolic dish, a parabolic reflector, a radio frequency receiver, an antenna, an optical receiver, an optical emitter, a lens, an aperture, or some other suitable type of communications device. In some cases, a communications device "pointing" in a particular direction may be referred to as the communications device being steered in a certain direction. This steering may be performed mechanically and/or electronically.

As one illustrative example, first node 424 in node group 418 may take the form of first communications system 524. First communications system 524 comprises first number of communications devices 526. As used herein, a "number of" items means one or more items. In this manner, first number of communications devices 526 means one or more communications devices.

In this illustrative example, first number of communications devices 526 includes first communications device 528 and second communications device 530. First communications device 528 may be configured to point in a selected direction to form first potential pathway 508 between first node 424 in node group 418 and first end node 408 in first end node group 308. In other words, first communications device 528 points towards first end node 408 in first end node group 308 such that wireless signals may be sent to and/or received from first end node 408 in first end node group 308.

Further, second communications device 530 may be configured to point in a selected direction to form second potential pathway 510 between first node 424 in node group 418 and second end node 410 in first end node group 308. In other words, second communications device 530 points towards second end node 410 in first end node group 308 such that wireless signals may be sent to and/or received from second end node 410 in first end node group 308.

In a similar manner, second end node 410 in first end node group 308 may take the form of second communications system 532. Second communications system 532 comprises second number of communications devices 534. Second number of communications devices 534 includes first communications device 536 and second communications device 538.

First communications device 536 is configured to point in a selected direction to form first potential pathway 512 between second end node 410 in first end node group 308 and second node 426 in node group 418. In other words, first communications device 536 points towards second node 426 in node group 418 such that wireless signals may be sent to and/or received from second node 426 in node group 418.

Second communications device 538 is configured to point in a selected direction to form second potential pathway 514 between second end node 410 in first end node group 308 and first node 424 in node group 418. In other words, second communications device 538 points towards first node 424 in node group 418 such that wireless signals may be sent to and/or received from first node 424 in node group 418.

In some cases, first communications device 536 may also be configured to point in a selected direction to form first potential pathway 516 between first node 424 and first end node 412. For example, first communications device 536 may include a first aperture configured to point towards first end node 408 and a second aperture configured to point towards first end node 412 in second end node group 310. Similarly, second communications device 538 may also be configured to point in a selected direction to form second potential pathway 518 between first node 424 and second end node 414.

Of course, in other illustrative examples, first number of communications devices 526 may include two communications devices in addition to first communications device 528 and second communications device 530. These additional communications devices may be configured to form first potential pathway 516 and second potential pathway 518.

As depicted, controller 428 is configured to control node group 418. Node switcher 430 is configured to select either first node 424 or second node 426 for forming communications link 442 and either first node 424 or second node 426 for forming communications link 444. When node switcher 430 selects one of first node 424 and second node 426, a pathway selector in plurality of pathway selectors 432 corresponding to the selected node is configured to select one of the plurality of potential pathways formed by the selected node. This selected potential pathway may then be used to form a communications link.

For example, plurality of pathway selectors 432 may include first pathway selector 540 and second pathway selector 542. First pathway selector 540 corresponds to first node 424. Further, first pathway selector 540 is configured to select and use one of first plurality of potential pathways 500 to form communications link 442. Additionally, first pathway selector 540 may be configured to select and use one of first plurality of potential pathways 504 to form communications link 444.

Second pathway selector 542 corresponds to second node 426. Further, second pathway selector 542 is configured to select and use one of second plurality of potential pathways 502 to form communications link 442. Additionally, second pathway selector 542 may be configured to select and use one of second plurality of potential pathways 506 to form communications link 444.

The illustrations of communications environment 300 in FIG. 3, communications network 302 in FIG. 4, and the different potential pathways in FIG. 5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, node group 418 may include more than two nodes. In other illustrative examples, set of node groups 400 may include more than one node group. In some illustrative examples, a portion of control system 316 may be implemented in a data processing system located remote to plurality of node groups 304 in FIG. 3.

Figure 6:
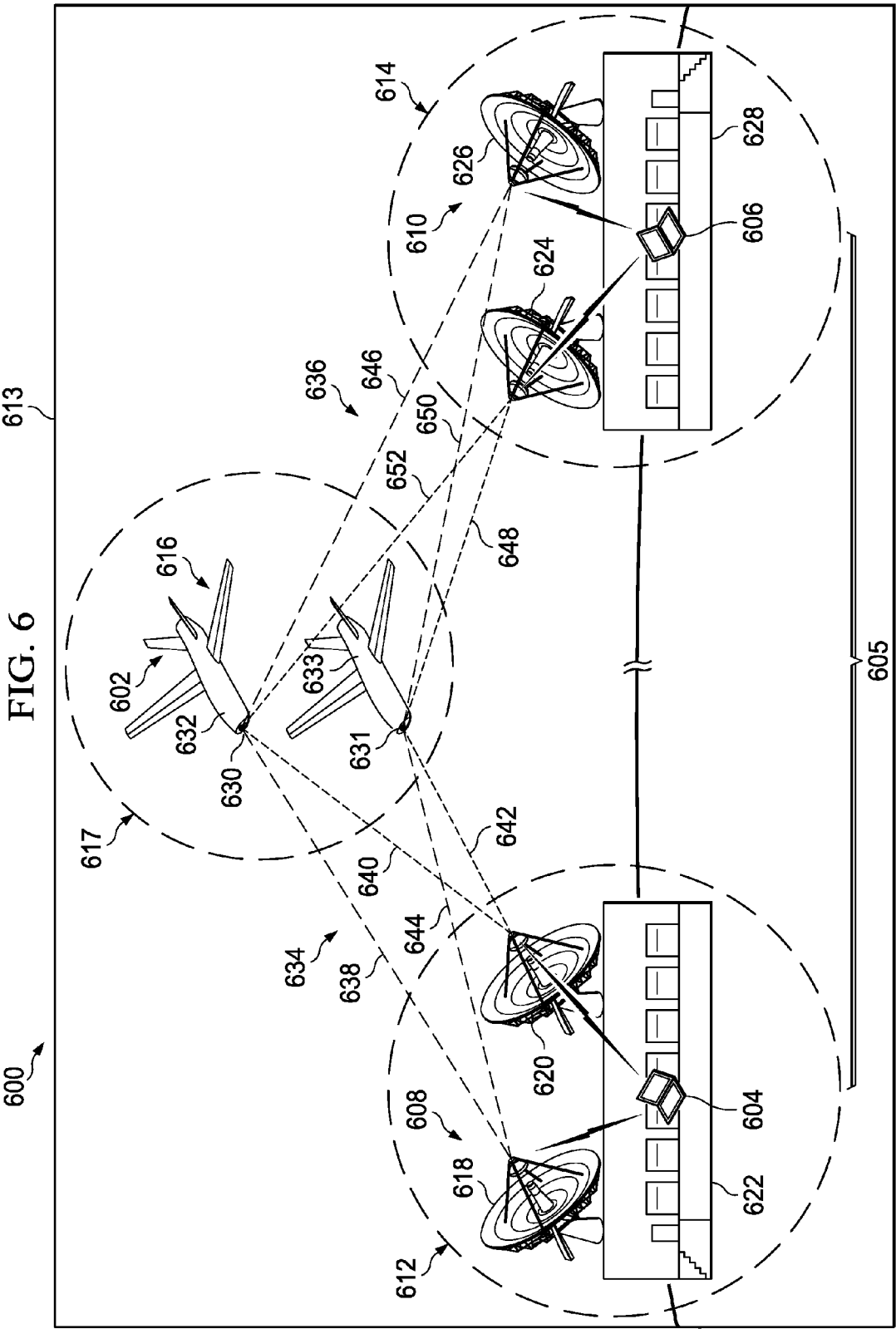
FIG. 6 is an illustration of a communications environment in accordance with an illustrative embodiment.

With reference now to FIG. 6, an illustration of a communications environment is depicted in accordance with an illustrative embodiment. In this illustrative example, communications environment 600 is an example of one implementation for communications environment 300 in FIG. 3. Communications network 602 is formed in communications environment 600 to allow communications between first computer 604 and second computer 606.

In this illustrative example, first computer 604 and second computer 606 are examples of one implementation for first end point 322 and second end point 324, respectively, in FIGS. 3 and 4. First computer 604 is configured to send and/or receive information using first end node group 608. Second computer 606 is configured to send and/or receive information using second end node group 610.

First end node group 608 and first computer 604 are located in first end region 612. Second end node group 610 and second computer 606 are located in second end region 614. First end region 612 and second end region 614 are ground regions in this illustrative example.

As depicted, distance 605 between first end node group 608 in first end region 612 and second end node group 610 in second end region 614 may be greater than a selected threshold for communications between first end node group 608 and second end node group 610. In particular, these two node groups are located too far apart from each other to be able to establish a communications link between these two node groups that has a desired bandwidth.

Instead, node group 616 is used to form a communications channel between first computer 604 and second computer 606. In this illustrative example, node group 616 is located in aerial region 617. Aerial region 617 is a region in airspace 613. In this manner, node group 616 may be referred to as an airborne node group.

As depicted, first end node group 608 includes first end node 618 and second end node 620. First end node 618 and second end node 620 are parabolic dishes in this illustrative example. Further, first end node 618 and second end node 620 are associated with building 622.

Second end node group 610 includes first end node 624 and second end node 626. First end node 624 and second end node 626 are also parabolic dishes in this illustrative example. Further, first end node 624 and second end node 626 are associated with building 628.

Node group 616 includes first node 630 and second node 631. First node 630 and second node 631 are airborne nodes. First node 630 and second node 631 may take the form of, for example, parabolic dishes. First node 630 is associated with unmanned aerial vehicle 632, while second node 631 is associated with unmanned aerial vehicle 633.

As depicted, first group of potential pathways 634 may be formed between first end node group 608 and node group 616. First group of potential pathways 634 includes potential pathways 638, 640, 642, and 644. Any one of these potential pathways may be used to exchange information between a node in first end node group 608 and a node in node group 616.

Second group of potential pathways 636 may be formed between node group 616 and second end node group 610. Second group of potential pathways 636 includes potential pathways 646, 648, 650, and 652. Any one of these potential pathways may be used to exchange information between a node in node group 616 and a node in second end node group 610.

In one illustrative example, first computer 604 sends information to first node 630 in node group 616 using second end node 620 in first end node group 608. In particular, second end node 620 sends the information to first node 630 using a communications link formed along potential pathway 640. First node 630 then sends this information to first end node 624 in second end node group 610 using a communications link formed along potential pathway 652. Second computer 606 receives this information from first end node 624 in second end node group 610.

If first node 630 becomes unavailable, second end node 620 in first end node group 608 may send the information to second node 631 in node group 616 using a communications link formed along potential pathway 642. Second node 631 may then send the information to first end node 624 in second end node group 610 using a communications link formed along potential pathway 648.

Figure 7:
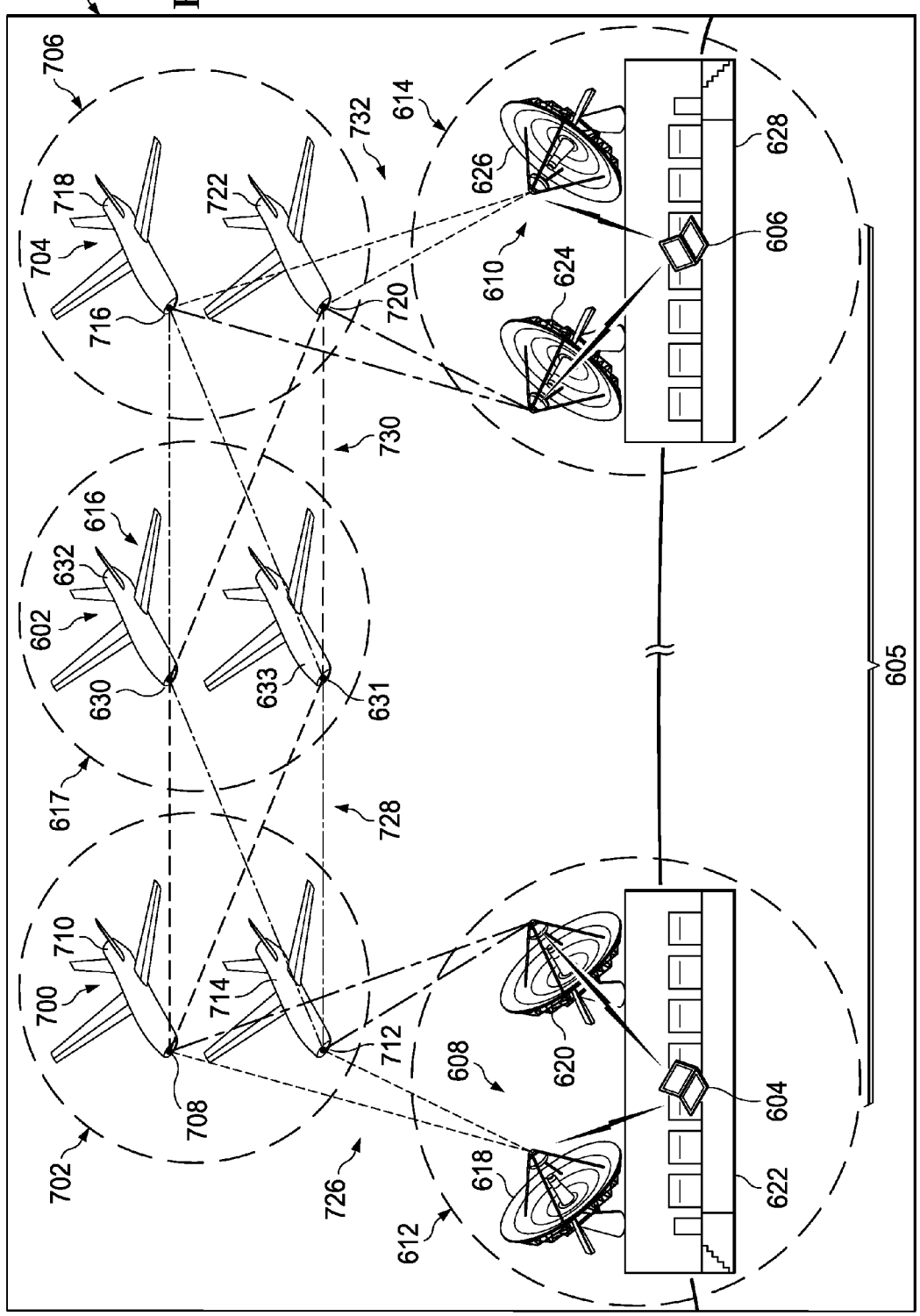
FIG. 7 is an illustration of another configuration for a communications network in accordance with an illustrative embodiment.

With reference now to FIG. 7, an illustration of another configuration for a communications network is depicted in accordance with an illustrative embodiment. In FIG. 7, another configuration for communications network 602 in FIG. 6 is depicted. In this illustrative example, communications network 602 also includes node group 700 located in aerial region 702 and node group 704 located in aerial region 706.

Node group 700 includes first node 708 implemented in unmanned aerial vehicle 710 and second node 712 implemented in unmanned aerial vehicle 714. Node group 704 includes first node 716 implemented in unmanned aerial vehicle 718 and second node 720 implemented in unmanned aerial vehicle 722.

In this illustrative example, any one of group of potential pathways 726 between first end node group 608 and node group 700 may be used to establish a first communications link. Further, any one of group of potential pathways 728 between node group 700 and node group 616 may be used to establish a second communications link. Any one of group of potential pathways 730 may be used to establish a third communications link. Further, any one of group of potential pathways 732 may be used to establish a fourth communications link.

These four communications links may form a series of communications links between first end node group 608 and second end node group 610. This series of communications links forms a communications channel between first computer 604 and second computer 606.

Figure 8:
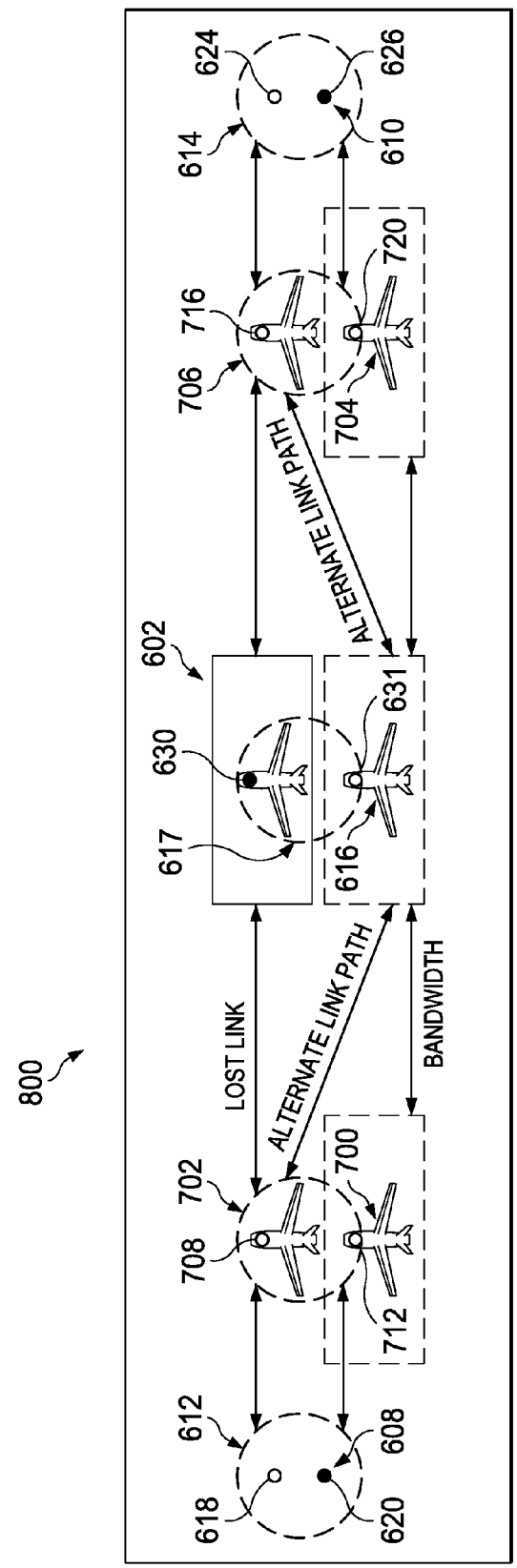
FIG. 8 is an illustration of an alternate state for a communications network in accordance with an illustrative embodiment.

With reference now to FIG. 8, an illustration of an alternate state for a communications network is depicted in accordance with an illustrative embodiment. In this illustrative example, alternate state 800 for communications network 602 having the configuration for communications network 602 in FIG. 7 is depicted.

In alternate state 800, first node 630 in node group 616 may become unavailable for providing communications between node group 700 and node group 704. However, with this configuration for communications network 602, second node 631 in node group 616 may be used to provide communications between node group 700 and node group 704.

In particular, second node 631 may use a potential pathway between first node 708 and second node 631 or a potential pathway between second node 712 and second node 631 to establish a communications link between node group 616 and node group 700. Further, second node 631 may use a potential pathway between first node 716 and second node 631 or a potential pathway between second node 720 and second node 631 to establish a communications link between node group 616 and node group 704.

In this manner, when any node in a node group in communications network 602 becomes unavailable, the other node in that node group may be used for forming communications links. In this manner, the communications channel formed between first computer 604 and second computer 606 in FIGS. 6 and 7 may have a desired level of availability. In particular, the communications channel formed using communications network 602 in FIGS. 6-8 may provide a level of availability over about 98 percent in these examples. Further, with this configuration, the communications channel may maintain a desired level of bandwidth over time.

The illustrations of communications network 602 in FIGS. 6-8 are not meant to imply physical or architectural limitations to the manner in which an illustrative embodiment may be implemented. Other components in addition to or in place of the ones illustrated may be used. Some components may be optional.

Figure 9:
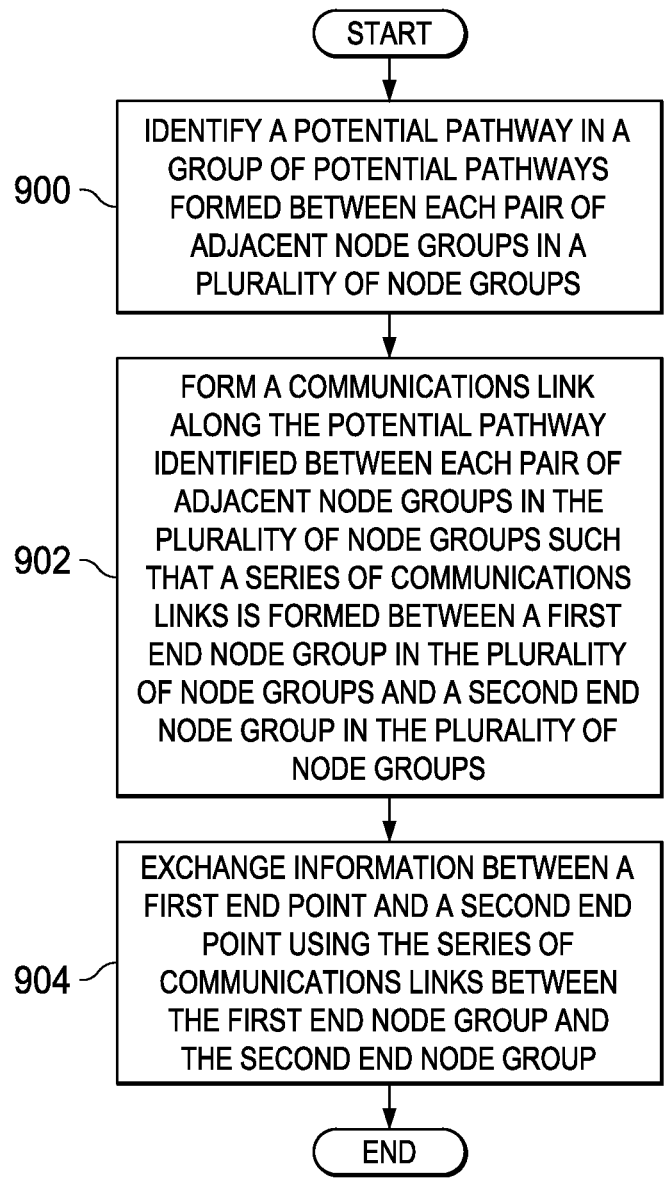
FIG. 9 is an illustration of a process for managing a communications network in the form of a flowchart in accordance with an illustrative embodiment.

With reference now to FIG. 9, an illustration of a process for managing a communications network in the form of a flowchart is depicted in accordance with an illustrative embodiment. The process illustrated in FIG. 9 may be implemented using communications network 302 and control system 316 in FIG. 3.

The process begins by identifying a potential pathway in a group of potential pathways formed between each pair of adjacent node groups in a plurality of node groups (operation 900). The process then forms a communications link along the potential pathway identified between each pair of adjacent node groups in the plurality of node groups such that a series of communications links is formed between a first end node group in the plurality of node groups and a second end node group in the plurality of node groups (operation 902).

Thereafter, the process exchanges information between a first end point and a second end point using the series of communications links between the first end node group and the second end node group (operation 904), with the process terminating thereafter. In operation 904, the series of communications links form a communications channel that has a desired level of availability and a desired level of reliability.

Figure 10:
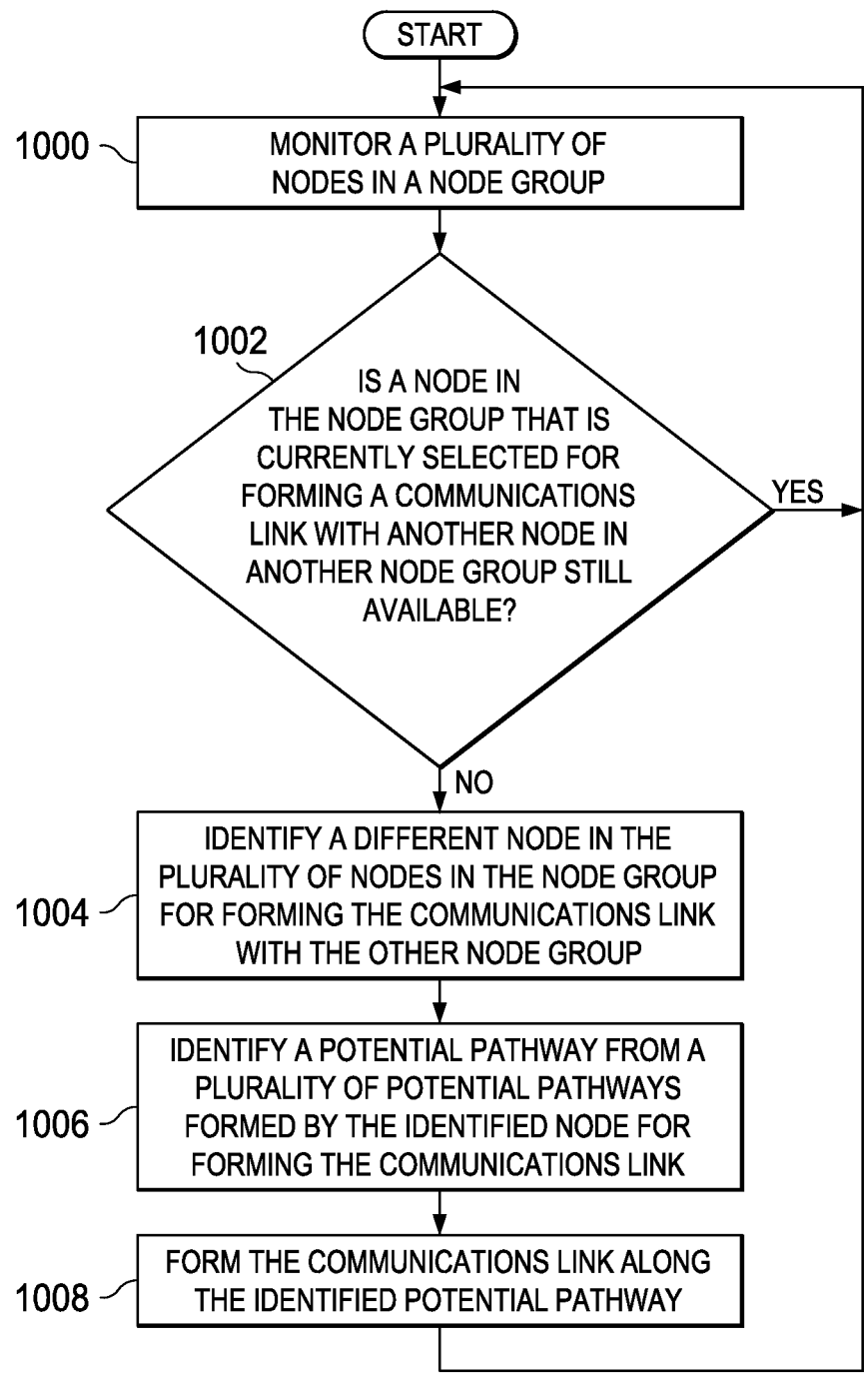
FIG. 10 is an illustration of a process for managing a communications link formed by a node group in the form of a flowchart in accordance with an illustrative embodiment.

With reference now to FIG. 10, an illustration of a process for managing a communications link formed by a node group in the form of a flowchart is depicted in accordance with an illustrative embodiment. The process illustrated in FIG. 10 may be implemented using a controller in plurality of controllers 328 in FIG. 3. For example, this process may be implemented using one of first end controller 330 in FIG. 3, second end controller 332 in FIG. 3, and controller 428 in FIG. 4.

The process begins by monitoring a plurality of nodes in a node group (operation 1000). The process then determines whether a node in the node group that is currently selected for forming a communications link with another node in another node group is still available (operation 1002). The node may become unavailable in a number of different ways. For example, if the node is an airborne node implemented on an aircraft, the node may become unavailable when the aircraft returns to the ground for refueling.

If the node in the node group that is currently selected for forming the communications link is still available, the process returns to operation 1000 as described above. Otherwise, the process identifies a different node in the plurality of nodes in the node group for forming the communications link with the other node group (operation 1004).

The process then identifies a potential pathway from a plurality of potential pathways formed by the identified node for forming the communications link (operation 1006). The process forms the communications link along the identified potential pathway (operation 1008), with the process then returning to operation 1000 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 11:
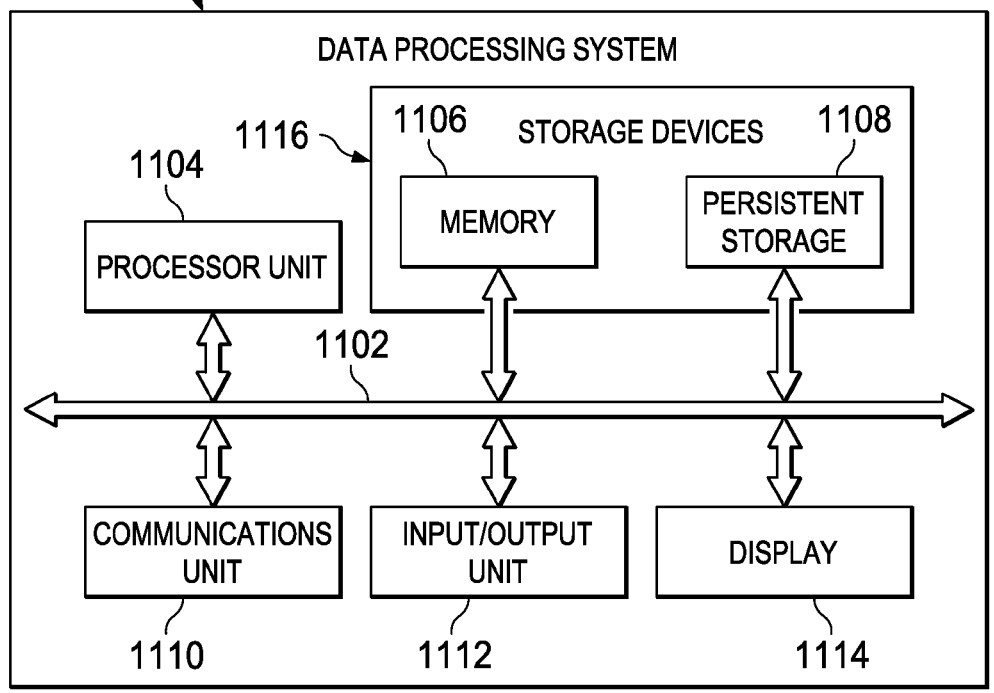
FIG. 11 is an illustration of a data processing system in accordance with an illustrative embodiment.
Figure 11:
Figure 11:
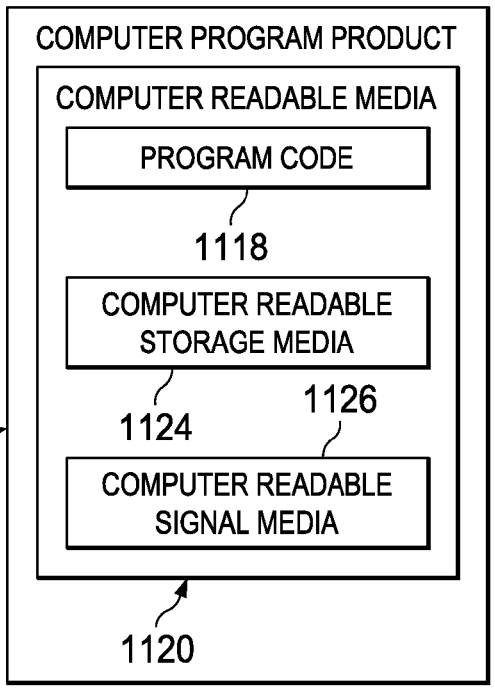

Turning now to FIG. 11, an illustration of a data processing system is depicted in accordance with an illustrative embodiment. In this illustrative example, data processing system 1100 may be used to implement one or more computers in computer system 318 in FIG. 3. In this illustrative example, data processing system 1100 includes communications framework 1102, which provides communications between processor unit 1104, memory 1106, persistent storage 1108, communications unit 1110, input/output (I/O) unit 1112, and display 1114.

Processor unit 1104 serves to execute instructions for software that may be loaded into memory 1106. Processor unit 1104 may be a number of processors, a multi-processor core, or some other type of processor, depending on the particular implementation. A number, as used herein with reference to an item, means one or more items. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and/or other suitable information either on a temporary basis and/or a permanent basis. Storage devices 1116 also may be referred to as computer readable storage devices in these examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications framework 1102. In these illustrative examples, the instructions are in a functional form on persistent storage 1108. These instructions may be loaded into memory 1106 for execution by processor unit 1104. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126.

Computer readable storage media 1124 may include, for example, an optical or magnetic disk that is inserted or placed into a drive or other device that is part of persistent storage 1108 for transfer onto a storage device, such as a hard drive, that is part of persistent storage 1108. Computer readable storage media 1124 also may take the form of a persistent storage, such as a hard drive, a thumb drive, or a flash memory, that is connected to data processing system 1100. In some instances, computer readable storage media 1124 may not be removable from data processing system 1100.

In these examples, computer readable storage media 1124 is a physical or tangible storage device used to store program code 1118 rather than a medium that propagates or transmits program code 1118. Computer readable storage media 1124 is also referred to as a computer readable tangible storage device or a computer readable physical storage device. In other words, computer readable storage media 1124 is a media that can be touched by a person.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for the data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 1118 may be omitted, because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

In another example, a bus system may be used to implement communications framework 1102 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1106 or a cache, such as found in an interface and memory controller hub that may be present in communications framework 1102.

Thus, the different illustrative embodiments provide a method and apparatus for establishing a communications channel that has a level of availability and a level of reliability that is greater than about 98 percent using one or more airborne node groups.

In another illustrative embodiment, a method for managing a communications network is provided. A potential pathway in a group of potential pathways formed between each pair of adjacent node groups in a plurality of node groups is identified. A communications link is formed along the potential pathway identified between each pair of adjacent node groups in the plurality of node groups such that a series of communications links is formed between a first end node group in the plurality of node groups and a second end node group in the plurality of node groups. Information is exchanged between a first end point and a second end point using the series of communications links between the first end node group and the second end node group.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A communications network comprising:
   a plurality of node groups, wherein each node group in the plurality of node groups comprises a plurality of nodes that include a number of communication devices and wherein the each node group in the plurality of node groups is configured to form a group of potential pathways for a communications link between the each node group and another node group in the plurality of node groups for sending and receiving wireless signals between the number of communication devices, and wherein a node group in the plurality of node groups is part of a plurality of aerial vehicles in flight;
   a control system configured to form a communications channel between a first end point and a second end point using a series of communications links between a first end node group in the plurality of node groups and a second end node group in the plurality of node groups, wherein a communications link in the series of communications links between a first node group in the plurality of node groups and a second node group in the plurality of node groups is formed along a potential pathway selected from the group of potential pathways between the first node group and the second node group; and a plurality of controllers, wherein a controller in the plurality of controllers is configured to control a node group in the plurality of node groups, the controller comprising:

a node switcher;

a first pathway selector and second pathway selector configured to select one of a first and second plurality of potential pathways, respectively, formed by a first node and a second node as a selected potential pathway when the first node and second node is selected by the node switcher; and wherein the selected potential pathway is used to form a particular communications link between node groups based on a desired level of availability and a desired level of reliability.

2. The communications network of claim 1, wherein the plurality of node groups comprises:

the first end node group;

the second end node group; and a set of node groups, wherein the first node group is selected from one of the first end node group, the second end node group, and a node group in the set of node groups and wherein the second node group is selected from one of the first end node group, the second end node group, and the node group in the set of node groups.

3. The communications network of claim 2, wherein at least one of the first end node group, the second end node group, and the node group in the set of node groups is located in an aerial region.

4. The communications network of claim 1, wherein a node in the plurality of nodes in a node group in the plurality of node groups comprises:

a communications system configured to form a plurality of potential pathways between the node and another node in another plurality of nodes in another node group in the plurality of node groups.

5. The communications network of claim 4, wherein a communications device in the number of communications devices is selected from one of a parabolic dish, a parabolic reflector, a radio frequency receiver, an antenna, an optical emitter, an optical receiver, a lens, and an aperture.

6. The communications network of claim 1, wherein the control system comprises:

a plurality of controllers, wherein a controller in the plurality of controllers is configured to control a node group in the plurality of node groups.

7. The communications network of claim 6, wherein the controller comprises:

a node switcher configured to select one of a first node and a second node in the plurality of nodes in the node group for forming a particular communications link between the node group and another node group in the plurality of node groups.

8. The communications network of claim 7, wherein the controller further comprises:

a plurality of pathway selectors comprising:

a first pathway selector configured to select one of a first plurality of potential pathways formed by the first node as a selected potential pathway when the first node is selected by the node switcher; and a second pathway selector configured to select one of a second plurality of potential pathways formed by the second node as the selected potential pathway when the second node is selected by the node switcher, wherein the selected potential pathway is used to form the particular communications link between the node group and the another node group in the plurality of node groups.

9. The communications network of claim 1, wherein the communications channel has a desired bandwidth.

10. The communications network of claim 1, wherein each communications link in the series of communications links is formed between a pair of adjacent node groups in the plurality of node groups.

11. The communications network of claim 1, wherein steering the number of communications devices comprises changing directions that the number of communications devices are pointing to form the group of potential pathways.

12. The communications network of claim 1, wherein the pathway selector selects the communications link between the node group in the plurality of node groups and the another node group in the plurality of node groups using a second node in the node group in response to a determination that the first node in the node group is unavailable.

13. The communications network of claim 1, wherein an aerial vehicle in the plurality of aerial vehicles is an aircraft.

14. A communications network comprising:

a plurality of node groups comprising:

a first end node group;

a second end node group; and a set of node groups, wherein each node group in the set of node groups comprises a plurality of airborne nodes that include a number of communication devices, wherein each of the plurality of node groups is configured to form a group of potential pathways for a communications link with another node group in the plurality of node groups for sending and receiving wireless signals between the number of communication devices, and wherein a node group in the plurality of node groups is part of a plurality of aerial vehicles in flight; and a control system configured to form a communications channel between the first end node group and the second end node group, the control system comprising a plurality of controllers, wherein each controller in the plurality of controllers is configured to control a corresponding node group in the plurality of node groups and form one communications link in a series of communications links between the first end node group and the second end node group, wherein the one communications link is formed between the corresponding node group and an adjacent node group in the plurality of node groups along a potential pathway selected from the group of potential pathways formed between the corresponding node group and the adjacent node group; and the controller comprising:

a node switcher;

a first pathway selector and second pathway selector configured to select one of a first and second plurality of potential pathways, respectively, formed by a first node and a second node as a selected potential pathway when the first node and second node is selected by the node switcher; and wherein the selected potential pathway is used to form a particular communications link between node groups based on a desired level of availability and a desired level of reliability.

15. A method for managing a communications network, the method comprising:

identifying a potential pathway in a group of potential pathways formed between each pair of adjacent node groups in a plurality of node groups, wherein each node group in each pair of adjacent node groups in the plurality of node groups comprises a plurality of nodes that include a number of communication devices, and wherein a node group in the plurality of node groups is part of a plurality of aerial vehicles in flight;

forming a communications link along the potential pathway identified between the each pair of adjacent node groups in the plurality of node groups such that a series of communications links is formed between a first end node group in the plurality of node groups and a second end node group in the plurality of node groups for sending and receiving wireless signals between the number of communication devices, wherein the series of communications links forms a communications channel between a first end node and a second end node;

exchanging information between a first end point and a second end point using the series of communications links between the first end node group and the second end node group;

controlling a node group in the plurality of node groups;

selecting one of a first and second plurality of potential pathways, respectively, formed by a first node and a second node as a selected potential pathway when the first node and second node is selected by a node switcher; and wherein the selected potential pathway is used to form a particular communications link between node groups based on a desired level of availability and a desired level of reliability.

16. The method of claim 15 wherein the communications channel further comprises a desired bandwidth.

17. The method of claim 15, wherein the step of identifying the potential pathway in the group of potential pathways formed between the each pair of adjacent node groups in the plurality of node groups comprises:

identifying the potential pathway in the group of potential pathways formed between a first node group in the plurality of node groups and a second node group in the plurality of node groups, wherein the potential pathway is between one of a first plurality of nodes in the first node group and a second plurality of nodes in the second node group.

18. The method of claim 15, wherein the step of identifying the potential pathway in the group of potential pathways formed between the each pair of adjacent node groups in the plurality of node groups comprises:

selecting a node in a plurality of nodes in a node group in the plurality of node groups; and selecting the potential pathway from a plurality of potential pathways formed by the node selected.

19. The method of claim 15 further comprising:

determining whether a first node in a node group in the plurality of node groups is unavailable for forming a particular communications link between the node group and another node group in the plurality of node groups; and forming the communications link between the node group in the plurality of node groups and the another node group in the plurality of node groups using a second node in the node group in response to a determination that the first node in the node group is unavailable.

* * * * *